United States Patent
Matsukawa et al.

(10) Patent No.: US 6,692,809 B2
(45) Date of Patent: Feb. 17, 2004

(54) OPTICAL RECORDING MEDIUM

(75) Inventors: Makoto Matsukawa, Yamanashi-ken (JP); Seiro Oshima, Yamanashi-ken (JP); Toshihiko Takishita, Yamanashi-ken (JP)

(73) Assignee: Pioneer Corporation, Tokyo (JP)

( * ) Notice: Subject to any disclaimer, the term of this patent is extended or adjusted under 35 U.S.C. 154(b) by 34 days.

(21) Appl. No.: 10/022,417

(22) Filed: Dec. 20, 2001

(65) Prior Publication Data

US 2002/0081414 A1 Jun. 27, 2002

(30) Foreign Application Priority Data

Dec. 26, 2000 (JP) ........................................ 2000-394353

(51) Int. Cl.$^7$ ................................................ B32B 3/02
(52) U.S. Cl. .................... 428/64.1; 428/64.5; 428/64.6; 369/275.4; 430/270.13
(58) Field of Search ............................... 428/64.1, 64.4, 428/64.5, 64.6, 913; 430/270.13, 495.1, 945; 369/275.4, 283, 288

(56) References Cited

U.S. PATENT DOCUMENTS

| | | | | |
|---|---|---|---|---|
| 6,071,588 A | * | 6/2000 | Nobumasa | 428/64.1 |
| 6,128,270 A | * | 10/2000 | Nishikawa | 369/275.4 |
| 6,146,733 A | * | 11/2000 | Inoue | 428/64.1 |
| 6,410,115 B1 | * | 6/2002 | Tsai | 428/64.1 |
| 2002/0024913 A1 | * | 2/2002 | Kojima | 369/94 |
| 2002/0076646 A1 | * | 6/2002 | Zhou | 430/270.13 |
| 2002/0098315 A1 | * | 7/2002 | Tabata | 428/64.4 |

* cited by examiner

Primary Examiner—Elizabeth Mulvaney
(74) Attorney, Agent, or Firm—Arent Fox Kintner Plotkin & Kahn

(57) ABSTRACT

An optical recording medium is provided which comprises: a substrate including concentrically or spirally formed grooves each having a V-shaped cross section; a first dielectric layer formed on the substrate; a phase-change recording layer formed on the first dielectric layer; a second dielectric layer formed on the phase-change recording layer; and a metallic reflecting layer formed on the second dielectric layer. In particular, the optical recording medium is so formed that an objective lens having an aperture number of 0.55–0.70 can be used and a laser beam having a wavelength of 600–700 nm and passing through the objective lens is passed through the substrate and then converged on the recording layer, thereby recording or reproducing information on the recording layer in areas corresponding to the grooves. Specifically, the optical recording medium further comprises a third dielectric layer consisting of a nitride, the third dielectric layer being disposed between the first dielectric layer and the phase-change recording layer. In this way, it is possible to prevent a deterioration possibly caused due to a heat in the boundary between the first dielectric layer and the second dielectric layer, thereby greatly increasing the number of possible times for over-write recording.

6 Claims, 2 Drawing Sheets

OPTICAL RECORDING MEDIUM

BACKGROUND OF THE INVENTION

1. Field of the Invention

The present invention relates to a phase-change type optical recording medium, particularly to an optical recording medium capable of repeatedly recording information at a high recording density.

The present application claims priority from Japanese Application No. 2000-394353, the disclosure of which is incorporated herein by reference for all purposes.

2. Description of the Related Prior Art

There has been known a phase-change type optical recording medium which is capable of recording, reproducing and erasing information by virtue of a laser beam irradiation. A basic principle for recording, reproducing and erasing information in a phase-change type optical recording medium can be explained as follows. Namely, a laser beam is used to irradiate a recording layer formed on a substrate to effect a reversible change between an amorphous state and a crystal state on information recording areas of the recording layer. In more detail, when information is to be recorded in an optical recording medium, a laser beam having a high output and a short pulse is used to irradiate the recording medium to heat information recording areas to a temperature equal to or higher than their melting point, followed by a quick cooling of the heated areas, thereby forming recording marks in amorphous state. On the other hand, when the recording marks are to be erased, a laser beam having a lower output and a longer pulse than those used during the recording is used to irradiate the recording layer, in a manner such that the recording marks are heated to a temperature equal to or higher than their crystallizing temperature, followed by a gradual cooling treatment, thereby rendering the recording area to return back to the crystal state and thus erasing the recording marks. Further, when information recorded in the optical recording medium is to be reproduced, a laser beam having a lower output is used to irradiate the information recording layer, so as to read the recorded information by virtue of change in the reflectance of the recording area.

Furthermore, the above-described phase-change optical recording medium is capable of over-write recording by modulating the intensity of a single laser beam. During the over-write recording, the above-described recording and erasing are performed simultaneously such that when new information is recorded, recorded information is at the same time erased, thereby making it possible to omit an independent erasing process. At this time, the single laser beam is modulated between a recording power (capable of heating the recording layer to a temperature equal to or higher than its melting point) and an erasing power (capable of heating the recording power to a temperature equal to or higher than its crystallizing temperature and lower than its melting point), in a manner such that the laser beam is modulated to the recording power in areas where recording marks are to be newly formed, but modulated to the erasing power in other areas. In this way, irrespective of whether the recording layer before irradiation is in an amorphous state or a crystalline state, the areas irradiated by a laser beam having the recording power will all become into amorphous state, while the areas irradiated by a laser beam having the erasing power will all become into crystalline state, thereby effecting the over-write recording.

Since the above-described phase-change type optical recording medium is capable of performing recording, reproducing and over-writing by modulating the intensity of a single laser beam, such an optical recording medium is considered to be an excellent recording medium since it is allowed to use a simplified optical system on its drive side and also since the recording medium is Interchangeable with other existing read-only disc such as CD-ROM, rendering itself extremely useful as a recording media having a large storing capacity and capable of performing a rewriting process.

A conventional phase-change type optical recording medium comprises a first dielectric layer, a recording layer, a second dielectric layer, a reflecting layer and a protection layer, successively laminated on a substrate. The substrate is formed by a material substantially transparent with respect to a laser beam (for recording and reproducing information) passing from below. In fact, such a material may be a glass or a resin such as a polycarbonate. The recording layer is formed by a material in which phase-change will occur upon being irradiated by a laser beam. In practice, such a material forming the recording layer may be a chalcogenide material such as Ge—Te—Sb.

The first dielectric layer, the second dielectric layer and the reflecting layer are provided to prevent oxidization of the recording layer (so as to prevent a deterioration possibly caused due to repeated over-write recording), and to adjust a heat response during recording process, as well as to enhance an optical effect during reproducing process. With regard to an optical enhancement effect, the first dielectric layer produces a multiple interference effect between the substrate and the recording layer, while the second dielectric layer produce a multiple interference effect between the recording layer and the reflecting layer. In this way, it is possible to increase a reflectance changing amount of the recording layer, thereby improving the data quality of the recording medium. Here, the first and second dielectric layers are formed mainly by ZnS and $SiO_2$, while the reflecting layer is formed by a metal having a high reflectance, which may be a monomeric metal such as Al, Au and Ag or an alloy. The protection layer is provided for preventing the recording medium from getting wounded and for ensuring sufficient corrosion resistance. In fact, the protection layer is usually formed by a resin.

On the other hand, since the above-described phase-change optical recording medium is required to have a higher recording density, it has been considered necessary to shorten the wavelength of the laser beam, reduce the thickness of the substrate, improve the aperture number of an objective lens, and select an appropriate recording manner (land groove recording). In order to produce such a high density recording medium, there have been at least the following approaches which are: 1) using a blue-violet semiconductor laser having a wavelength of about 400 nm; 2) employing near-field recording/reproducing technique using SIL (Solid Immersion Lens), 3) reducing land-groove width in land-groove recording.

However, the above approaches have been found to have the following problems, which are: 1) the blue-violet semiconductor laser requires the use of a light source having a high and stable output and a long lifetime, but such a light source has not yet been in its reliably useful form; 2) the near-field recording/reproducing technique fails to have an interchangeability with other recording medium since it employs a special lens; 3) reducing land-groove width requires to reduce the width of groove walls so as to ensure a necessary width for land upper surface or for the flat portion of groove bottom surface. With regard to problem 3), although it is preferable that an angle approximately equal to 90 degrees be formed between the groove wall surfaces, this will make it difficult to form a recording medium substrate by virtue of injection molding.

In order to solve the above problems so as to realize a high density recording, it has been suggested to use an objective lens having an aperture number of 0.55–0.70, and to use a laser beam having a wavelength of 600–700 nm, thereby making it possible to use an optical recording medium having a plurality of V-shaped grooves concentrically or spirally formed on the substrate. At this time, since a groove pitch is also a track pitch, a track pitch of 0.7–0.8 μm, preferably 0.5 μm or less is useful for realizing a high recording density.

FIG. 3 is an explanatory view showing a conventional phase-change type optical recording medium adopting the above suggestion. In the drawing, reference numeral 1 is a substrate having a plurality of V-shaped grooves 1a formed concentrically or spirally on a substrate. These grooves are arranged at a pitch p, each groove having a depth d and a half-value width w. A first dielectric layer 2, a phase-change type recording layer 3, a second dielectric layer 4, a metallic reflecting layer 5 and a protection layer 6 are successively laminated on the substrate 1. A laser beam having a wavelength of 600–700 nm travels from below the substrate 1 so as to form recording marks on the recording layer 3 in areas corresponding to the grooves 1a. In this way, by virtue of refraction caused due to inclined surfaces of grooves 1a, since a laser beam converged by an objective lens may be further converged, it is allowed to obtain an effect equivalent to that obtainable when improving the aperture number of an objective lens. Furthermore, since light components not received by the grooves 1a are not converged into the recording marks, and since these light components will not be detected out as reproduction signals, it is sure to prevent a cross talk and a cross erase, thereby ensuring a high recording density.

However, with regard to the above-described phase-change type optical recording medium including the substrate, the first dielectric layer, the phase-change type recording layer, the second dielectric layer and the metallic reflecting layer, there has been a problem that over-write recording can cause an undesired jitter at an extremely early time. In addition, according to the results of the experiment conducted by the inventors of the present invention, it is understood that if a recording medium substrate is a polycarbonate disc including a plurality of grooves having a track pitch of 0.7 μm, a depth of 20 nm and a half-value width of 0.35 μm, and if an over-write recording is performed for 1000 times, an actually allowable limit (jitter 9%) will be undesirably broken.

SUMMARY OF THE INVENTION

It is an object of the present invention to provide an improved optical recording medium having a high recording density and a good over-write performance, which is so formed that even if a recording medium substrate has a plurality of V-shaped grooves, it is still possible to reduce jitter and increase the number of times for over-write recording.

According to the present invention, there is provided an optical recording medium comprising: a substrate including concentrically or spirally formed grooves each having a V-shaped cross section; a first dielectric layer formed on the substrate; a phase-change recording layer formed on the first dielectric layer; a second dielectric layer formed on the phase-change recording layer; and a metallic reflecting layer formed on the second dielectric layer. In particular, the optical recording medium is so formed that an objective lens having an aperture number of 0.55–0.70 can be used and a laser beam having a wavelength of 600–700 nm and passing through the objective lens is passed through the substrate and then converged on the recording layer, thereby recording or reproducing information on the recording layer in areas corresponding to the grooves. Specifically, the optical recording medium further comprises a third dielectric layer consisting of a nitride, the third dielectric layer being disposed between the first dielectric layer and the phase-change recording layer.

In one aspect of the invention, the third dielectric layer mainly contains silicon nitride or germanium nitride, and has a thickness of 1–7 nm.

In another aspect of the invention, each of the first and second dielectric layers contains zinc sulfide and silicon oxide.

In further aspect of the invention, the phase-change recording layer mainly contains In, Ag, Sb and Te.

In one more aspect of the invention, the grooves are periodically meandered, having a track pitch of 0.7–0.8 μm, a depth of 20–30 nm and a width of 0.35±0.05 μm.

In still one more aspect of the invention, the metallic reflection layer mainly contains Al and Ti, with Ti being 0.5–0.5 atom %.

According to the above constitution, since the third dielectric layer consisting of a nitride and having a desired softness is provided between the first dielectric layer and the phase-change recording layer, it is sure to prevent a deterioration possibly caused due to a heat between the phase-change recording layer and the first dielectric layer, thereby improving a reversible characteristic between an amorphous state and a crystal state on the phase-change recording medium. In this way, it is possible to alleviate a deterioration possibly caused by jitter and to increase the number of possible times for over-write recording, even under a condition where an optical recording medium is used which has a high recording density and includes a substrate having V-shaped grooves.

BRIEF DESCRIPTION OF THE DRAWINGS

These and other objects and advantages of the present invention will become clear from the following description with reference to the accompanying drawings, wherein.

DETAILED DESCRIPTION OF THE PREFERRED EMBODIMENT

Figure 1:
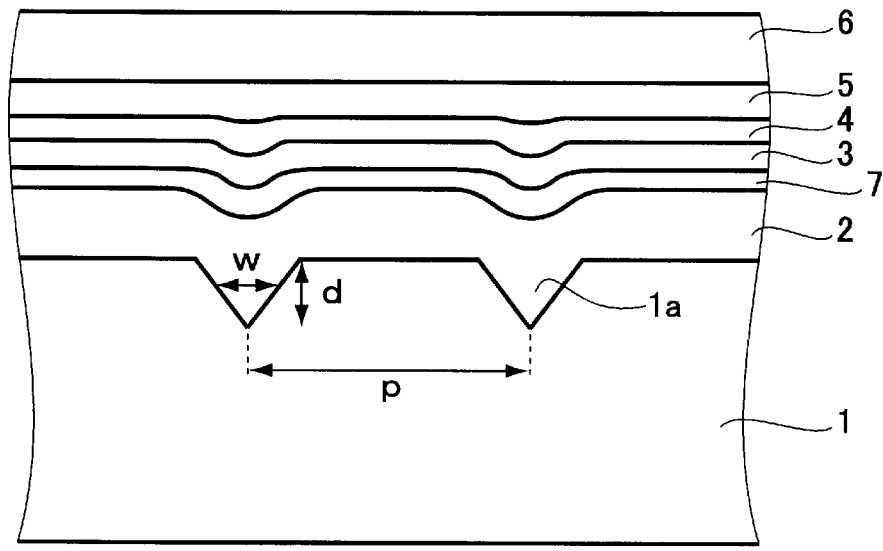
FIG. 1 is an explanatory view showing an optical recording medium formed according to one embodiment of the present invention.

One embodiment of the present invention will be described below with reference to the accompanying drawings (the same elements as those in the above described prior art will be represented by the same reference numerals).

Referring to FIG. 1, an optical recording medium of the present invention includes a substrate 1 having a plurality of V-shaped grooves formed concentrically or spirally on the substrate. A first dielectric layer 2, a third dielectric layer 7, a phase-change recording layer 3, a second dielectric layer 4, a metallic reflecting layer 5 and a protection layer 6 are successively formed on the substrate 1. Such an optical recording medium is irradiated by a laser beam coming from below and passing through the substrate 1. In fact, the laser beam is converged on the recording layer 3, thereby effecting the recording or reproducing of information on the recording layer in areas corresponding to grooves 1a. Here, the laser beam is obtained from a light source having a stable performance and a long lifetime. In order to ensure an interchangeability with other recording medium, it is preferable to use an objective lens having an aperture number of 0.55–0.70 and to use a light source having a wavelength of 600–700 nm.

Since the substrate 1 is required to allow the passing of the laser beam for recording or reading information, it is preferred to be formed by a glass or a resin having a high light transmittance (85% or more) and a low optical anisotropy. Here, the resin is preferred to be a thermal-plastic resin, such as an acryl resin, polycarbonate resin and a polyolefin resin. In order for the substrate to have a desired mechanical strength, to ensure a desired workability in forming grooves and to ensure a low production cost, it is preferred to use a polycarbonate resin. In more detail, the substrate 1 is in the form of a disc-like plate having a thickness of 0.6±0.03 mm. A plurality of wobble grooves 1a meandered periodically in disc radial direction, as well as a plurality of prepits representative of address information are formed on the surface of the substrate. Each groove 1a is V-shaped in its cross section, having a depth d of 20–30 nm, a half-value width w of 0.35±0.05 $\mu$m, and a track pitch p of 0.7–0.8 $\mu$m.

The first dielectric layer 2 mainly contains zinc sulfide (ZnS) and silicon oxide ($SiO_2$) with $SiO_2$ content being 10–30 atom %. The thickness of the first dielectric layer is preferred to be 40–70 nm. Here, the first dielectric layer 2 can serve as a protection layer for protecting the recording layer 3, and also for adjusting an optical character as well as a thermal character of the recording medium. However, in the case where the first dielectric layer 2 is formed (by sputtering) into a thin film on the substrate 1 (on which a plurality of V-shaped grooves 1a have already been formed), the recording layer 3 laminated on the first dielectric layer 2 will be undesirably formed with a plurality of pits corresponding to the grooves 1a formed on the substrate 1. In fact, such pits are caused due to a deterioration in the characteristic of the over-write recording.

The third dielectric layer 7 is formed by a nitride, mainly containing silicon nitride ($Si_3N_4$) or germanium nitride ($Ge_3N_4$) The thickness of the third dielectric layer 7 is preferred to be 1–7 nm. Specifically, the nitride is so chosen that it can enhance the crystallization of the recording layer, and is preferred to have a higher softness than the first dielectric layer (mainly containing ZnS and $SiO_2$).

The phase-change recording layer 3 contains In—Ag—Sb—Te as its main component and has a thickness of 15–25 nm. The In—Ag—Sb—Te has a high sensitivity, while the contours of its amorphous portions have clear features, rendering itself to be suitable for use as a recording layer (for mark-edge recording).

The second dielectric layer 4 mainly contains zinc sulfide (ZnS) and silicon oxide ($SiO_2$), with the content of $SiO_2$ being 10–30 atom %. The thickness of the second dielectric layer 4 is preferred to be 10–15 nm. Specifically, the second dielectric layer 4 serves as a protection layer for physically and chemically protecting the recording layer 3. Preferably, the second dielectric layer 4 is formed by a material capable of preventing a deterioration possibly caused due to an oxidation of the recording layer 3.

The metallic reflecting layer 5 mainly contains Al and Ti, forming an Al—Ti alloy film, with Ti content being 0.5–5.0 atom %. In fact, the metal film layer 5 is formed by sputtering and has a thickness of 50–300 nm. The protection layer 6 is formed by applying an ultraviolet-setting resin using a spin-coating method, followed by irradiating the resin with an ultraviolet ray. Preferably, the protection layer 6 has a thickness of 1–250 $\mu$m.

A process for manufacturing the optical recording medium of the present invention may be described below. In the case where the substrate 1 is formed by a polycarbonate resin, an injection molding process is employed so that a plurality of V-shaped grooves 1a are formed on the surface of the substrate 1. Subsequently, a sputtering process is carried out to successively deposit the first dielectric layer 2, the third dielectric layer 7, the phase-change recording layer 3, the second dielectric layer 4, the metallic reflecting layer 5 on the substrate 1. Afterwards, the protection layer 6 is formed to cover up the surface of the metallic reflecting layer 5. However, the film formation in the present invention should not be limited to sputtering, it is also possible to employ commonly used physical deposition such as electron beam deposition, resistance heating deposition, molecule line epitaxy.

Advantages of the optical recording medium formed according to the present invention will be described below.

At first, although a high density recording requires the formation of narrow track pitch, the V-shaped grooves formed according to the present invention provide enlarged groove width (which can be used in recording), so that the groove width is almost as large as the track pitch. In this way, even in the case where the track pitch is narrow, it is still possible to record a large amount of information with a high density.

In conventional land/groove recording, although the diameter of laser beam may be converged into a size equal to or smaller than a track pitch, beam light components having relatively low intensity will still spread out in the areas surrounding the laser beam, undesirably forming outer edge light components irradiating adjacent tracks, with their reflected light components being undesirably detected by an optical pickup. Consequently, cross talk and cross erasure will happen in relation to adjacent tracks, making it impossible to realize a high density recording. Different from such prior art, in the present invention, the V-shaped grooves can ensure that light components going beyond the groove width do not receive a polarizing effect of the V-shaped slopes. In this way, the outer edge light components can be distinguished from the signal light forming the recording marks, and can be prevented from going to the optical pickup. As a result, it is allowed to ensure that the outer edge light components can be exactly prevented from being detected, and an erasing light can be prevented from erasing the recording marks, thereby making it possible to avoid cross talk or cross erasure.

On the other hand, in the case where the wobble grooves 1a are formed as having V-shaped cross section, a plurality of pits will undesirably occur on the recording layer 3 in areas corresponding to the grooves 1a formed on the substrate 1. At this time, if the third dielectric layer 3 is not formed and if the over-write recording is performed repeatedly, a deterioration such as pealing-off is likely to occur in the boundary between the recording layer 3 and the dielectric layer 2 (due to heat shocks occurring in the pits formed on the recording layer 3), thus undesirably reducing the number of possible times for over-write recording. In order to solve this problem, according to the present invention, the third dielectric layer 7 consisting of a nitride is provided between the first dielectric layer 2 and the recording layer 3. Specifically, the third dielectric layer 7 has a sufficient softness and a strong heat resistance and is capable of promoting the crystallization of the recording layer. In fact, the third dielectric layer 7 is formed mainly by a silicon nitride or a germanium nitride, thereby ensuring a sufficient durability for over-write recording.

Figure 2:
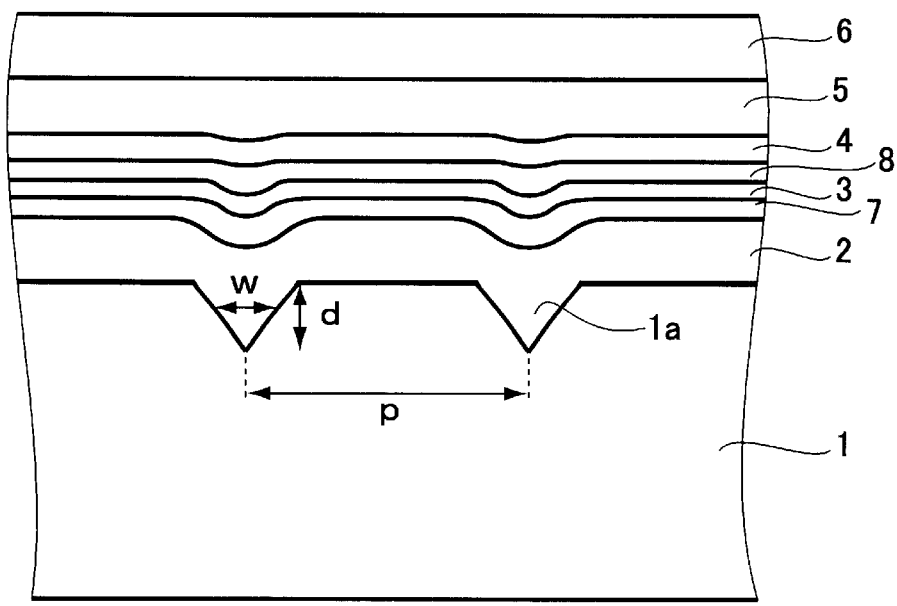
FIG. 2 is an explanatory view showing an optical recording medium formed according to another embodiment of the present invention.

Next, a second embodiment of the present invention will be described in the following with reference to FIG. 2. Actually, the second embodiment is almost the same with the first embodiment except that a fourth dielectric layer 8 is provided between the phase-change recording layer 3 and the second dielectric layer 4. Accordingly, the same identical elements are represented by the same reference numerals. Similar to the third dielectric layer 7, the fourth dielectric layer 8 is also formed by a nitride. For example, it is formed by mainly containing a silicon nitride ($Si_3N_4$) or germanium nitride ($Ge_3N_4$). Also, similar to the third dielectric layer 7, the fourth dielectric layer 8 has a thickness of 1–7 nm. In fact, the fourth dielectric layer 8 is provided to prevent a possible deterioration on the boundary between the recording layer 3 and the second dielectric layer 4.

Although the above description has been focused on a single plate type optical recording medium, an optical recording medium can also be formed by including two single-plate type mediums, thereby obtaining a two-disc type recording medium by bonding together two single-plate type discs using an adhesive agent with a protection layer interposed therebetween. At this time, an adhesive agent for bonding together the two single-plate type discs may be an ultraviolet-setting adhesive agent.

The present invention will be described in more detail below by giving an example and a comparative example. Namely, a disc A is prepared to represent an example of the present invention, while a disc B is prepared to represent a comparative example, thereby making a comparison (with regard to the number of possible times for over-write recording) between the example and the comparative example.

EXAMPLE
Preparing Disc A Shown in FIG. 1

A disc substrate 1 is prepared which has a plurality of periodically meandered V-shaped grooves 1a, with track pitch p being 0.7 μm, groove depth d being 20 nm, half-value width w being 0.35 μm. Such disc substrate 1 is formed by injection molding a polycarbonate resin, obtaining a disc having a diameter of 120 mm and a thickness of 0.6 mm. Then, the first dielectric layer 2 consisting of ZnS—$SiO_2$ having a thickness of 60 nm and $SiO_2$ content of 20 atom %, the third dielectric layer 7 consisting of $Ge_3N_4$ and having a thickness of 2 nm, the phase-change recording layer 3 consisting of In:5.5 atom %/Ag:3.5 atom %/Sb:64 atom %/Te:27 atom %, the second dielectric layer 4 consisting of ZnS—$SiO_2$ having a thickness of 12 nm and $SiO_2$ content of 20 atom %, and the metallic reflecting layer 5 consisting of AiTi and having a thickness of 200 nm, are successively formed on the substrate 1. In fact, these layers are all formed by sputtering. Finally, an ultraviolet-setting resin is applied to the surface of the metallic reflecting layer 5 using a method called "spin coatings", followed by irradiating the applied resin using an ultraviolet ray, thereby forming a protection layer 6 having a thickness of 10 μm and thus producing a finished optical recording medium.

Figure 3:
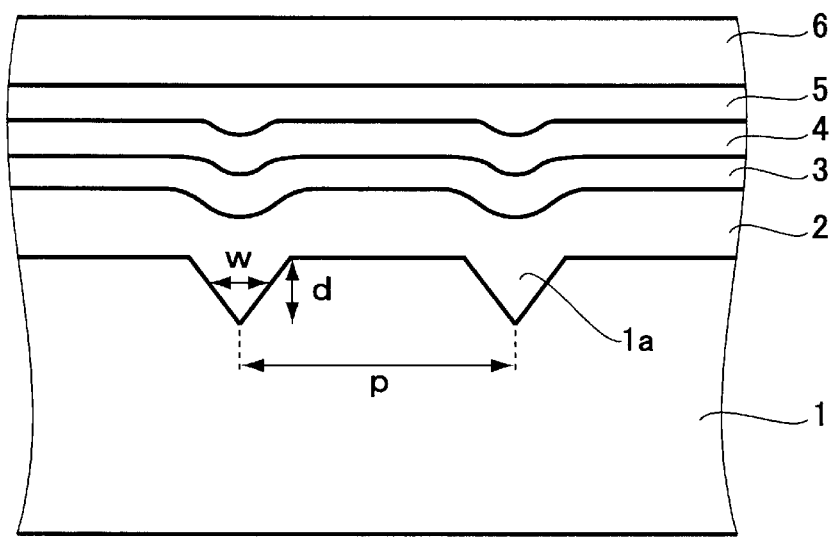
FIG. 3 is an explanatory view showing an optical recording medium formed according to a prior art.

Comparative Example
Preparing Disc B Shown in FIG. 3

A disc substrate 1 is prepared which has a plurality of periodically meandered V-shaped grooves 1a, with track pitch p being 0.7 μm, groove depth d being 20 nm, half-value width w being 0.35 μm. Such disc substrate 1 is formed by injection molding a polycarbonate resin, obtaining a disc having a diameter of 120 mm and a thickness of 0.6 mm. Then, the first dielectric layer 2 consisting of ZnS—$SiO_2$ having a thickness of 60 nm and $SiO_2$ content of 20 atom %, the phase-change recording layer 3 consisting of In:5.5 atom %/Ag:3.5 atom %/Sb:64 atom %/Te:27 atom %, the second dielectric layer 4 consisting of ZnS—$SiO_2$ having a thickness of 12 nm and $SiO_2$ content of 20 atom %, and the metallic reflecting layer 5 consisting of AiTi and having a thickness of 200 nm, are successively formed on the substrate 1. In fact, these layers are all formed by sputtering. Finally, an ultraviolet-setting resin is applied to the surface of the metallic reflecting layer 5 using a method called "spin coating", followed by irradiating the applied resin using an ultraviolet ray, thereby forming a protection layer 6 having a thickness of 10 μm and thus producing a finished optical recording medium. It is understood from the above that the disc B is different from disc A in that disc B does not contain the third dielectric layer 7.

The above disc A and disc B were tested for the number of possible times for over-write recording, using the same identical optical recording medium evaluation apparatus. Here, the number of possible times for over-write recording is a maximum possible number capable of controlling jitter at 9% or lower. The test results are shown in the graph of FIG. 4.

Figure 4:
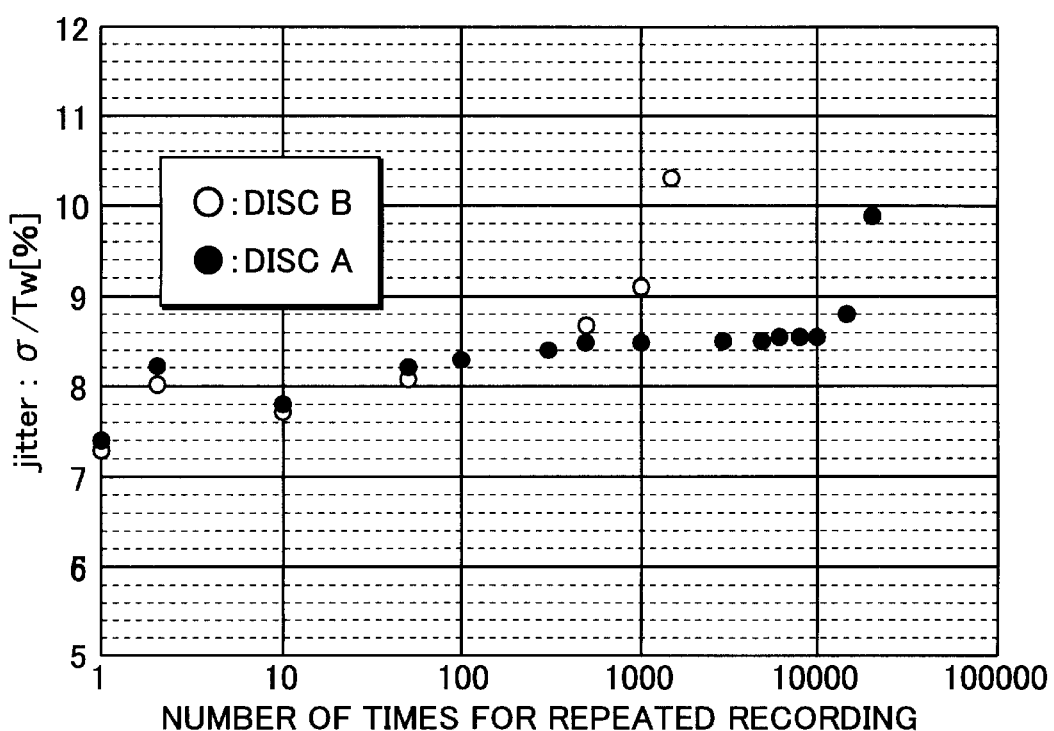
FIG. 4 is a graph showing a comparison in the number of possible times for over-write recording between the examples and comparative examples.

As may be understood from the graph shown in FIG. 4, disc B made in the Comparative Example is associated with a problem that once the number of times for over-write recording is over 1000 times, jitter will be 9% or more. In contrast, disc A made in the Example of the present invention is capable of prohibiting the jitter at 9% or lower, even under a condition that the number of times for over-write recording is 1000 times. It is understood from the above comparison that the provision of the third dielectric layer consisting of nitride makes it possible to increase the number of possible times for over-write recording, even if the optical disc includes a substrate having a plurality of periodically meandered V-shaped grooves 1a, with track pitch p being 0.7 μm, groove depth d being 20 nm, half-value width w being 0.35 μm.

With the use of the present invention, even if an optical recording medium includes a substrate having a plurality of V-shaped grooves, it is still possible to inhibit a deterioration possibly caused due to jitter, and to increase the number of possible times for over-write recording, thereby making it possible to provide an improved optical recording medium having a high recording density and an excellent over-write recording performance.

While the invention has been described in conjunction with preferred specific embodiment thereof, it will be understood that this description is intended to illustrate and not limit the scope of the invention, which is defined by the following claims.

What is claimed is:
1. An optical recording medium comprising:
 a substrate including concentrically or spirally formed grooves each having a V-shaped cross section not including any horizontal flat portion in its bottom area;

a first dielectric layer formed on the substrate;

a phase-change recording layer formed on the first dielectric layer;

a second dielectric layer formed on the phase-change recording layer; and a metallic reflecting layer formed on the second dielectric layer;

wherein the optical recording medium is so formed that an objective lens having an aperture number of 0.55–0.70 can be used and a laser beam having a wavelength of 600–700 nm and passing through the objective lens is passed through the substrate and then converged on the recording layer, thereby recording or reproducing information on the recording layer in areas corresponding to the groves;

wherein the optical recording medium further comprises a third dielectric layer consisting of a nitride, the third dielectric layer consisting of a nitride, the third dielectric layer being disposed between the first dielectric layer and the phase-change recording layer.

2. An optical recording medium according to claim 1, wherein the third dielectric layer mainly contains silicon nitride or germanium nitride, and has a thickness of 1–7 nm.

3. An optical recording medium according to claim 1, wherein each of the first and second dielectric layers contains zinc sulfide and silicon oxide.

4. An optical recording medium according to claim 1, wherein the phase-change recording layer mainly contains In, Ag, Sb and Te.

5. An optical recording medium according to claim 1, wherein the grooves are periodically meandered, having a track pitch of 0.7–0.8 $\mu$m, a depth of 20–30 nm and a width of 0.35±0.05 $\mu$m.

6. An optical recording medium according to claim 1, wherein the metallic reflection layer mainly contains Al and Ti, with Ti being 0.5–5.0 atom %.

* * * * *